United States Patent [19]

Müller

[11] Patent Number: 5,813,806
[45] Date of Patent: Sep. 29, 1998

[54] HOBBING MACHINE

[75] Inventor: Wolfgang Müller, Ludwigsburg, Germany

[73] Assignee: Hermann-Pfauter GmbH & Co., Ludwigsburg, Germany

[21] Appl. No.: 644,230

[22] Filed: May 10, 1996

[30] Foreign Application Priority Data

May 12, 1995 [DE] Germany ................ 295 07 871 U

[51] Int. Cl.⁶ .................................................. B23F 21/00
[52] U.S. Cl. .......................... 409/11; 409/19; 409/23; 409/137; 82/124; 82/901
[58] Field of Search ............... 82/124, 901; 409/11, 409/22, 23, 19, 20, 15, 137

[56] References Cited

U.S. PATENT DOCUMENTS

| | | | |
|---|---|---|---|
| 3,561,321 | 2/1971 | Belshaw et al. | 90/4 |
| 4,514,936 | 5/1985 | Hurtado | 409/137 X |
| 4,663,721 | 5/1987 | Herscovici | 409/15 X |
| 4,822,217 | 4/1989 | Lunazzi | 409/11 |
| 5,062,330 | 11/1991 | Trautmann et al. | 82/147 |
| 5,263,800 | 11/1993 | Chen | 409/137 |
| 5,586,848 | 12/1996 | Suwijn | 409/137 |

FOREIGN PATENT DOCUMENTS

| | | | |
|---|---|---|---|
| 0226201 | 10/1986 | Japan | 82/124 |
| 404183553 | 6/1992 | Japan | 409/137 |

*Primary Examiner*—A. L. Pitts
*Assistant Examiner*—Henry W. H. Tsai
*Attorney, Agent, or Firm*—Robert W. Becker & Associates

[57] ABSTRACT

The hobbing machine has a tool assembly with a tool spindle and a workpiece holding assembly with a workpiece spindle. A first drive unit for driving the tool spindle is provided. A second drive unit for driving the workpiece spindle is provided. The tool spindle and/or the workpiece spindle is a rotor of the first and second drive unit so that the tool spindle and/or workpiece spindle can be directly driven by the drive unit.

24 Claims, 3 Drawing Sheets

HOBBING MACHINE

BACKGROUND OF THE INVENTION

The present invention relates to a hobbing machine with a tool assembly comprising a tool spindle and a workpiece holding assembly comprising a work piece spindle. Each spindle is driven by a drive unit.

With such hobbing machines cylindrical toothings are produced in a continuous hobbing process. The workpiece is clamped in a workpiece spindle and the tool is clamped in a tool spindle. For driving these spindles, electric motors are provided which are arranged laterally adjacent to the corresponding spindle and which are connected thereto with gear boxes. These gear boxes require considerable space. Furthermore, they are expensive and impede the kinematic and dynamic precision of the transmission of the movement.

It is therefore an object of the present invention to provide the aforementioned hobbing machine with a compact design that allows for high precision machining, provides for a simple reliable sealing of the radial and axial carriages, and can be produced in inexpensively.

SUMMARY OF THE INVENTION

The inventive hobbing machine according to the present invention is primarily characterized by:

A tool assembly with a tool spindle;

A workpiece holding assembly with a workpiece spindle;

A first drive unit for driving the tool spindle;

A second drive unit for driving the workpiece spindle; and

Wherein at least one of the tool spindle and the workpiece spindle is a rotor of the first and second drive unit, respectively.

Advantageously, the first drive unit and/or the second drive unit is an electric motor.

The first drive unit and/or the second drive unit can also be a hydraulic drive.

Advantageously, the tool spindle and/or the workpiece spindle comprise a clamping device.

Preferably, the hobbing machine further comprises a catch funnel.

Preferably, the hobbing machine further comprises a machine bed that is thermally decoupled from the catch funnel.

The catch funnel has sidewalls and the sidewalls are spaced from the machine bed. Preferably, the hobbing machine comprises insulation positioned between the sidewalls and the machine bed. The side walls are made of rustproof material, preferably stainless steel.

The sidewalls are positioned at an angle of slant and the angle of slant is greater than a static friction angle of cuttings of the workpiece at the surface of the sidewalls.

The hobbing machine preferably further comprises a machining chamber with chamber walls, wherein the tool assembly is enclosed by the machining chamber and wherein at least one of the chamber walls is positioned at an angle of slant that greater than a static friction angle of cuttings of the workpiece at the surface of the chamber walls.

Advantageously, the tool assembly and the workpiece holding assembly are electronically coupled. Preferably, the hobbing machine further comprises an NC (numerically controlled) control device for electronically coupling the tool assembly and the workpiece assembly.

In yet another embodiment of the present invention the hobbing machine further comprises a workpiece changer for loading and removing workpieces.

Preferably, the workpiece changer comprises a double gripping device pivotable about a pivot axis perpendicular to the axis of the workpiece spindle.

Preferably, the pivot axis is positioned exterior to the machining chamber.

Advantageously, the hobbing machine further comprises a first carriage with a first linear guide system for the tool assembly and a second carriage with a second linear guide system for the workpiece holding assembly, wherein the first carriage with the first linear guide system and the second carriage with the second linear guide system are arranged exterior to the machining chamber.

The tool assembly and the workpiece holding assembly extend through the chamber walls of the machining chamber so as to have a minimal sealing surface area.

In the inventive hobbing machine the workpiece spindle and/or the tool spindle are directly driven, i.e., a gear box between the drive unit and the respective spindle is no longer necessary. This results in a compact design of the hobbing machine without precision-reducing, vibration-sensitive gear boxes which also can be manufactured inexpensively.

BRIEF DESCRIPTION OF THE DRAWINGS

The objects and advantages of the present invention will appear more clearly from the following specification in conjunction with the accompanying drawings, in which.

DESCRIPTION OF PREFERRED EMBODIMENTS

Figure 1:
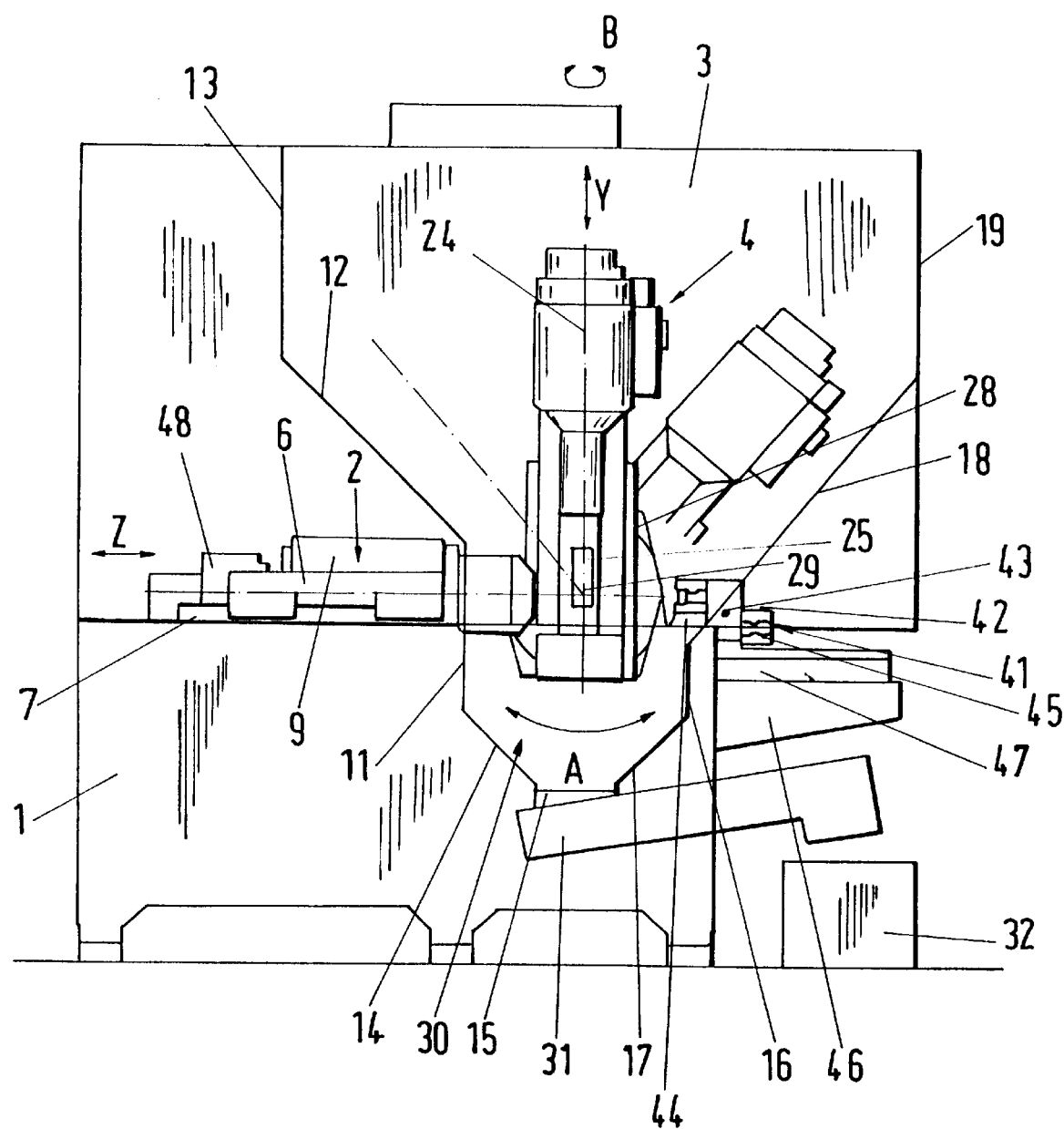
FIG. 1 shows in a schematic representation a view of the inventive hobbing machine.

The present invention will now be described in detail with the aid of several specific embodiments utilizing FIGS. 1 through 3.

The inventive hobbing machine serves to manufacture cylindrical toothings in a continuous hobbing process with a worm gear-shaped or tooth-shaped tool. The hobbing machine has a machine bed 1 on which the workpiece holding assembly 2 can be displaced along the Z axis. The workpiece holding assembly 2 extends into a machining chamber 3 in which the tool assembly 4 is enclosed. The machining chamber 3 has an opening at a side accessible to the operator (opening not represented) which is closed off by a door. At the side of the machine accessible to the operator a control panel 5 is provided with which a NC control unit of the hobbing machine can be controlled. Preferably, the control panel 5 is pivotable about a vertical axis so that the operator can position it in a desired position.

The workpiece holding assembly 2 has an axial carriage 6 which is displacable along a linear guide system 7 along the Z axis. The guide system 7 is advantageously comprised of an anti-friction guideway which allows for high stiffness and precision of the guiding action. In the axial carriage 6 the workpiece spindle 8 is positioned which is indicated by a dash-dotted line in FIG. 2. The workpiece spindle 8 is driven by a motor 9 about its axis in the direction of rotation C. The workpiece spindle 8 is horizontally arranged and has a force clamping device 48 with which the workpiece to be machined is clamped and fastened at the workpiece spindle 8 in a non-represented clamping unit. For displacing the axial carriage 6 a drive unit 10 is provided which is arranged laterally adjacent to the axial carriage 6. Since such a drive unit is known, it will not be explained in detail in this context.

The axial carriage 6 extends through one sidewall 11 (FIG. 1) of the machining chamber 3. It extends perpendicularly to the workpiece spindle 8 and extends along the upper side of the machine bed 1 in the upward and downward direction. In the area above the penetration of the workpiece spindle 8 through the sidewall 11 a slanted intermediate wall 12 is provided which connects the vertical sidewall 11 with another upper vertical chamber wall 13. The chamber wall 13 extends to the upper end of the machine. The lower sidewall 11 has a transition within the machine bed 1 into a further slanted intermediate wall 14 which is connected with its lower edge to the outlet socket 15.

The sidewall 11 has positioned opposite thereto a sidewall 16 (FIG. 1) which extends parallel to it and which is connected via a slantedly arranged intermediate wall 17 to the outlet socket 15. In the upward direction, the sidewall 16 has a transition into a slantedly arranged intermediate wall 18 which is connected at an obtuse angle to a vertical chamber wall 19. The vertical chamber wall 19 extends to the upper side of the machine. The chamber walls 18 and 19 delimit the machining chamber 3 at a side thereof opposite the workpiece assembly 2. The slanted intermediate walls 14, 17 and 12, 18 are respectively positioned at the same level and diverge in the upward direction so that the machining chamber 3 widens in the upward direction.

Figure 2:
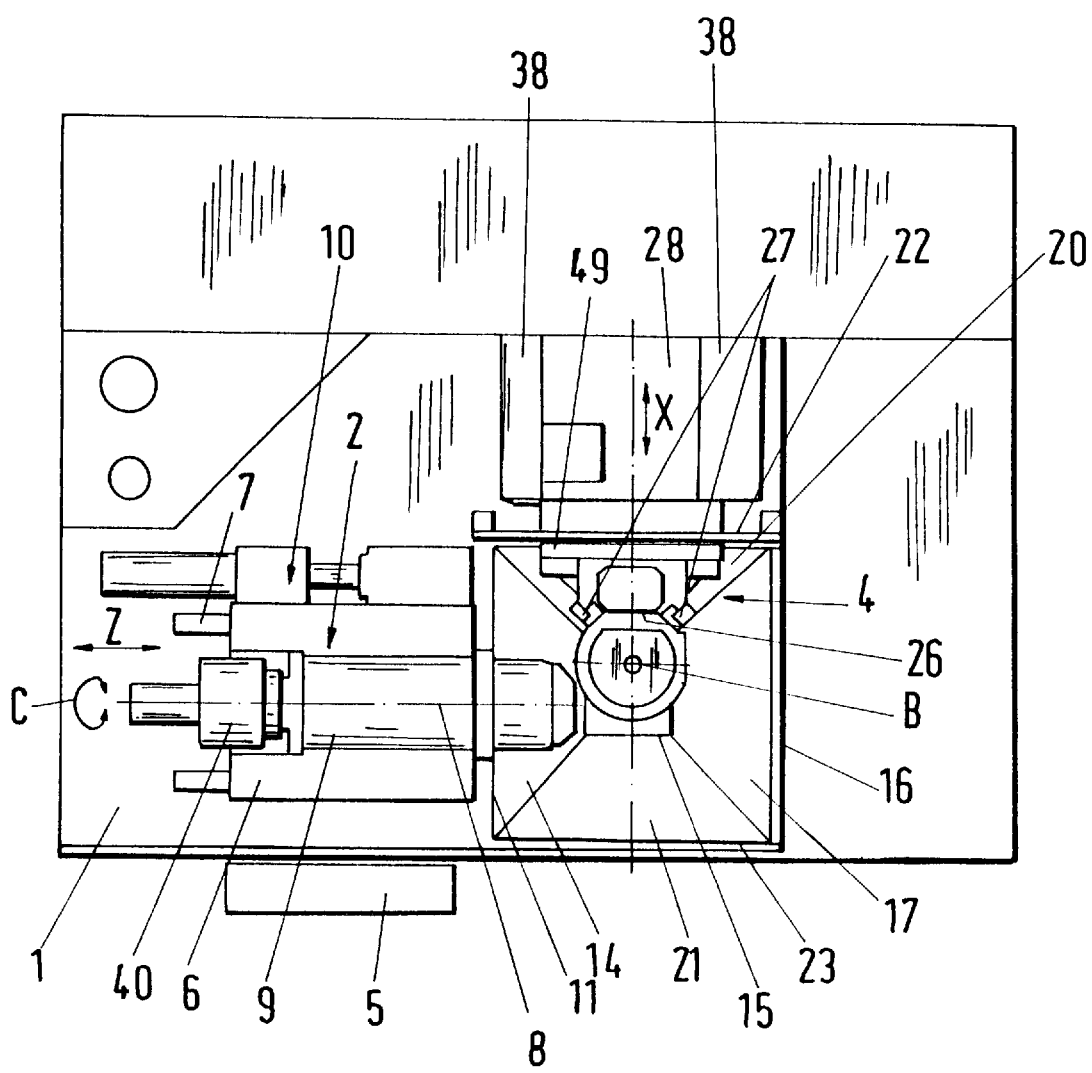
FIG. 2 shows a plan view of the hobbing machine of FIG. 1.
Figure 3:
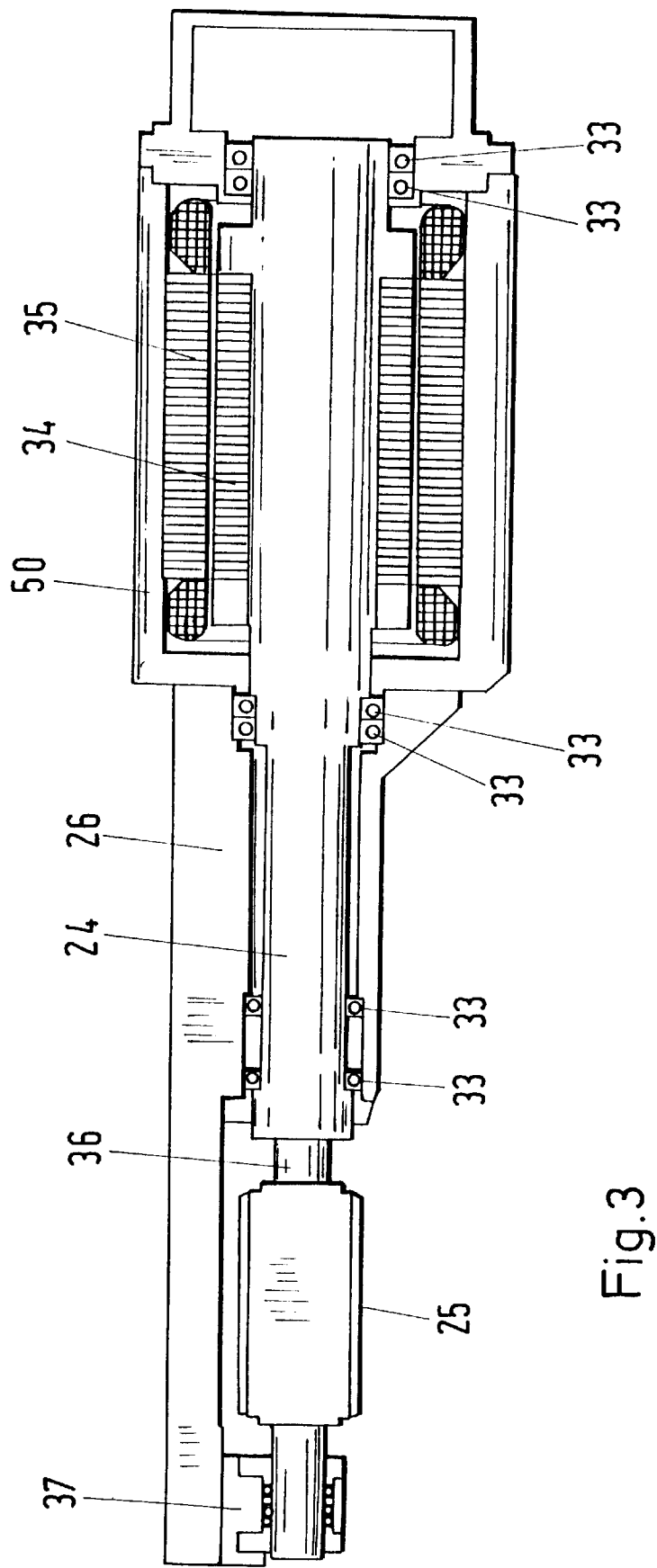
FIG. 3 shows in axial section an enlarged representation of a hobbing head of the inventive hobbing machine.

The lower slanted intermediate walls 14 and 17, as shown in FIG. 2, are connected with one another by further slanted intermediate walls 20 and 21. These intermediate walls 14, 17, 20, 21 converge in the downward direction and are connected to the outlet socket 15 which has a quadrangular, in the shown embodiment square, cross-section. The intermediate walls 14, 17, 20, 21 are parts of a catch funnel 30 for catching cuttings which are produced during machining of the workpiece. This funnel 30 has a quadrangular, preferably square, cross-section.

The oppositely arranged slanted intermediate walls 20 and 21 have a transition into vertical walls 22 and 23 which extend to the upper side of the machine bed 1. The tool assembly 4 is displaceable along the Y axis and is guided in a manner known per se in guide systems 27 at a turntable 49. The tool spindle 24, indicated in a dashed line in FIG. 1, can be rotatably driven about its axis in the direction B. Furthermore, the tool assembly 4 can be pivoted about an axis 29 which extends perpendicular to the axis of displacement Y and Z (double arrow A in FIG. 1) which is positioned at the level of the axis of the workpiece spindle 8. The tool spindle 24 has connected thereto the corresponding hobbing tool 25 (FIGS. 1 and 3). The tool spindle 24 can be provided with a clamping cone having a receiving element for receiving a tool 25. For clamping cylindrical tools 25, the tool spindle 24 can also be provided with a corresponding grip clamping device.

The tool assembly 4 has a carriage 26 (FIG. 2) which is guided along linear guide system 27 in the direction of axis Y. The tool assembly 4 is supported on the radial carriage 28 (FIG. 1) with which the tool assembly 4 and thus the tool 25 can be radially fed to the workpiece to be machined in the direction X (FIG. 2). The linear guide systems and the displacement drive unit for the radial carriage 28 are positioned exterior to the machining chamber 3.

FIG. 1 shows the vertical position of the tool assembly 4 as well as the right end position when the tool assembly is pivoted about the axis 29. The other end position upon pivoting about the axis 29 is represented in FIG. 1 with a dashed line. From the center position the tool assembly 4 can be, for example, pivoted about axis 29 in the pivoting direction A by 40° in both directions. Of course, other pivot angles are also possible.

The walls 11, 14, 16, 17, 20 to 23 define the downwardly tapering catch funnel 30 in which the cuttings produced during machining of the workpiece are collected and guided in the downward direction to the outlet socket 15. Below the outlet socket 15 a conveyor 31 (FIG. 1) is positioned onto which the cuttings fall from the funnel 30 to be collected thereon and which conveys the cuttings to the collecting receptacle 32 exterior to the machine. The slanted walls 14, 17, 20, 21 have such an angle of slant that the cuttings in any case will slide in the downward direction to the outlet socket 15, i.e., the angle of slant is so great that the gravitational force will overcome static friction of the cuttings at the surface and the cuttings will slide down. The angle of slant is thus greater than the so-called static friction angle at which the cuttings would still adhere to the surface by static friction. In the represented embodiment the angle of slant is preferably approximately 45° relative to the horizontal. In this manner it is ensured that cuttings cannot adhere to the sidewalls and thus cannot impede the machining of the workpiece.

Since the walls 12 and 18 in the area above the machine bed 1 are also slanted, cuttings that are thrown from the workpiece in the upward direction, can also be guided at the slantedly arranged intermediate walls in a reliable manner in the downward direction to the catch funnel 30. The angle of slant of these walls 12, 18 is so great that the cuttings cannot adhere to the side walls (static friction is overcome). The angle of slant of these walls 12, 18 is also approximately 45°. Thus it is ensured that the machining of the work piece within the machining chamber 3 can be performed without interference by the cuttings.

Since the cuttings due to the cutting machining steps are warm and in part very hot, the chamber walls of the machining chamber onto which the cuttings will fall will be heated with continuing machining operation to a greater and greater extent. In order to avoid transmission of this heat into the machine bed 1, the chamber walls are thermally decoupled relative to the machine bed 1. This is achieved by using at least for the walls 11, 14, 16, 17, 20 to 23 such sheet metal that is advantageously made of rustproof material, preferably stainless steel. Such sheet metal is to be arranged spaced at a distance to the corresponding side surfaces of the machine bed 1. For this purpose spacing bolts can be used which are arranged spaced from one another at least along the edges of the sheet metal. In this manner, a heat transmission from the walls of the funnel 30 onto the sides of the machine bed 1 is possible only via the spacing bolts which are advantageously comprised of a material that does not conduct heat well. In addition to such spacing bolts, between the walls 11, 14, 16, 17, 20 to 23 and the machine bed 1 an insulation layer may be arranged. It is also possible to connect the lateral sheet metal of the catch funnel 30 exclusively via an insulation with the corresponding sides of the machine bed 1.

Advantageously, the other walls 12, 13, 18, 22 are also in the same manner thermally decoupled relative to the machine.

At least one of the two spindles 8, 24, preferably both spindles, are directly driven. This will be explained in more detail in connection with FIG. 3 for the tool spindle 24. The tool spindle 24 is rotatably supported within the carriage 26 with bearings 33. At one end of the tool spindle 24 the tool 25 is fastened, for example, via a grip clamping device (not represented). At the other end a rotor 34 is located on the tool spindle 24 within the housing 50 that is fixedly connected to the carriage 26 whereby the rotor 34 is surrounded at a small distance by a stator 35 which is stationary within the carriage 26. The electric control of this electric motor is not represented in FIG. 3 in order not to complicate the drawing.

The hobbing tool 25 has optionally a shaft 36 which is connected with one end to the tool spindle 24 in a manner known per se. The other end of the hobbing tool 25 is rotatably supported in a manner known per se within a thrust bearing 37 that is provided at the carriage 26.

The tool 25 is connected rigidly with the tool spindle 24 which functions as the rotor so that a gear box between drive unit and tool spindle 24 is not needed. Thus, the hobbing machine has a constructively very simple design and is inexpensive to manufacture. Furthermore, due to the now obsolete gear box a very compact design of the hobbing machine results. By no longer requiring the gear box, all other disadvantages, (play, yielding, vibrations) are also avoided.

The workpiece spindle 8 is advantageously also directly driven in the same manner as the tool spindle 24 so that in the area of the workpiece holding assembly 2 a gear box between the drive unit and the workpiece spindle 8 is also not required.

The two assemblies 2 and 4 are arranged such that the machining of the workpiece clamped within the workpiece spindle 8 is performed directly above the funnel 30 so that the resulting cuttings are reliably collected within the funnel 30. The different movements of the assemblies 2 and 4 as well as of their spindles 8, 24 are carried out in a manner known per se by NC control. The drive units of the two spindles 8, 24 are preferably electric motors. It is however, also possible to use hydraulic drive with which the spindles 8, 24 are driven without gear box.

In order to be able to exchange the workpieces at the workpiece spindle 8 in a fast and simple manner, the machine bed 1 is provided with a workpiece changer 41 (FIG. 1). It has a double gripping device 42 which is pivotable about a horizontal axis 43 perpendicular to the workpiece spindle 8. The double gripping device 42 has two gripping pairs 44, 45 which grip the workpieces to be exchanged in a manner known per se. For changing a workpiece, the workpiece changer 41 is pushed forward in the axial direciton of the workpiece (Z axis) until the workpiece can be inserted with the double gripping device 42 into the clamping unit of the workpiece spindle. As is shown in FIG. 1, the workpiece changer 41 in the area of the slantedly arranged intermediate walls 18 is arranged such that the pivot axis 43 of the double gripping device 42 is positioned exterior to the machining chamber 3. The wall 18 has a corresponding opening for the double gripping device 42.

At one side of the machine bed 1 a console 46 is provided on which a support 47 for the workpieces to be changed is provided. The workpieces which have not been machined are collected thereon and are positioned within reach of the double gripping device 42.

With the workpiece changer 41 an extremely fast workpiece changing is ensured so that very short machining times can be realized. The workpieces which have not been machined are fed onto the support 47 with a non-represented transporting device so that the double gripping device 42 can grip the respective workpiece and advance and position it at the workpiece spindle 8.

The directly driven tool spindle 24 can be driven at very high rpm. For example, the tool spindle can be operated within an rpm range of 500 to 4,000 rpm. The maximum rpm of the tool spindle is approximately 3,000 rpm. This allows for rpm that have sufficient reserves for a successful use of tooth grinding tools consisting of any suitable cutting material as well as for cutting materials that are still under development at present.

The workpiece holding assembly 2 and the tool assembly 4 penetrate through simple openings (preferably circular openings) in the walls 11, 22 of the machining chamber 3. The carriages 6 and 28 of the workpiece holding assembly 2 and of the tool assembly 4 have in this area a corresponding preferably circular cylindrical design. This allows for a simple sealing relative to the machining chamber 3 with minimal sealing surface areas. In addition, the linear guide systems positioned exterior to the machining chamber 3 can be easily sealed.

The present invention is, of course, in no way restricted to the specific disclosure of the specification and drawings, but also encompasses any modifications within the scope of the appended claims.

What I claim is:

1. A hobbing machine comprising:
   a tool assembly with a tool spindle;
   a workpiece holding assembly with a workpiece spindle;
   a first drive unit for driving said tool spindle;
   a second drive unit for driving said workpiece spindle;
   wherein at least one of said tool spindle and said workpiece spindle is a rotor of said first and said second drive unit, respectively,
   a catch funnel positioned below a machining area of said tool assembly;
   a machine bed thermally decoupled from said catch funnel:
   said catch funnel having sidewalls spaced from said machine bed;
   an insulation positioned between said sidewalls and said machine bed.

2. A hobbing machine according to claim 1, wherein said first drive unit is an electric motor.

3. A hobbing machine according to claim 1, wherein said second drive unit is an electric motor.

4. A hobbing machine according to claim 1, wherein said first drive unit is a hydraulic drive.

5. A hobbing machine according to claim 1, wherein said second drive unit is a hydraulic drive.

6. A hobbing machine according to claim 1, wherein said tool spindle comprises a clamping device.

7. A hobbing machine according to claim 1, wherein said workpiece spindle comprises a clamping device.

8. A hobbing machine according to claim 1, wherein said sidewalls are made of rustproof material.

9. A hobbing machine according to claim 8, wherein said rustproof material is stainless steel.

10. A hobbing machine according to claim 1, wherein said sidewalls are positioned at an angle of slant and wherein said angle of slant is greater than a static friction angle of cuttings of the workpiece at a surface of said sidewalls.

11. A hobbing machine according to claim 1, further comprising a machining chamber with chamber walls, wherein said tool assembly is enclosed by said machining chamber, wherein at least one of said chamber walls is positioned at an angle of slant and wherein said angle of slant is greater than a static friction angle of cuttings of the workpiece at a surface of said chamber walls.

12. A hobbing machine according to claim 11, further comprising a first carriage with a first linear guide system for said tool assembly and a second carriage with a second linear guide system for said workpiece holding assembly wherein said first carriage with said first linear guide system and said second carriage with said second linear guide system are arranged exterior to said machining chamber.

13. A hobbing machine according to claim 12, wherein said tool assembly and said workpiece holding assembly extend through said chamber walls of said machining chamber so as have a minimal sealing surface area at said chamber walls.

14. A hobbing machine according to claim 1, wherein said tool assembly and said workpiece holding assembly are electronically coupled.

15. A hobbing machine according to claim 14, further comprising a NC control device for electronically coupling said tool assembly and said workpiece holding assembly.

16. A hobbing machine according to claim 1, further comprising a machining chamber for enclosing said tool assembly, wherein said machining chamber includes chamber walls with a lower end, wherein said catch funnel is connected to said lower ends of said chamber walls.

17. A hobbing machine according to claim 16, wherein at least one of said chamber walls is a slanted intermediate wall and wherein said catch funnel includes slanted intermediate sidewalls and vertical sidewalls, wherein said vertical sidewalls are positioned between said chamber walls and said slanted intermediate sidewalls.

18. A hobbing machine comprising:

a tool assembly with a tool spindle;

a workpiece holding assembly with a workpiece spindle;

a first drive unit for driving said tool spindle;

a second drive unit for driving said workpiece spindle;

wherein at least one of said tool spindle and said workpiece spindle is a rotor of said first and said second drive unit, respectively;

a machining chamber with chamber walls, wherein said tool assembly is enclosed by said machining chamber, wherein at least one of said chamber walls is positioned at an angle of slant and wherein said angle of slant is greater than a static friction angle of cuttings of the workpiece at a surface of said chamber walls;

a workpiece changer for loading and removing workpieces.

19. A hobbing machine according to claim 18, wherein said workpiece changer comprises a double gripping device pivotable about a pivot axis perpendicular to an axis of said workpiece spindle.

20. A hobbing machine according to claim 19, wherein said pivot axis is positioned exterior to said machining chamber.

21. A hobbing machine according to claim 18, further comprising a catch funnel positioned below a machining area of said tool assembly.

22. A hobbing machine according to claim 21, further comprising a machine bed, wherein said machine bed is thermally decoupled from said catch funnel.

23. A hobbing machine according to claim 22, wherein said catch funnel has sidewalls and wherein said sidewalls are spaced from said machine bed.

24. A hobbing machine according to claim 23, further comprising an insulation positioned between said sidewalls and said machine bed.

* * * * *